April 2, 1963

H. W. DIETERT ETAL 3,083,829

CONTINUOUS CLAY WASHER

Filed Nov. 7, 1960

INVENTORS
HARRY W. DIETERT
ALEXANDER L. GRAHAM
BY
ATTORNEYS

April 2, 1963     H. W. DIETERT ETAL     3,083,829
CONTINUOUS CLAY WASHER

Filed Nov. 7, 1960                                                        2 Sheets-Sheet 2

*INVENTORS*
HARRY W. DIETERT
BY ALEXANDER L. GRAHAM

ATTORNEYS 3,083,829
CONTINUOUS CLAY WASHER
Harry W. Dietert, Kerrville, Tex., and Alexander L. Graham, Detroit, Mich., assignors to Harry W. Dietert Co., Detroit, Mich., a corporation of Michigan
Filed Nov. 7, 1960, Ser. No. 67,700
8 Claims. (Cl. 209—161)

The invention relates to an elutriator and refers more specifically to apparatus for continuously washing clay and similar substances from granular material, such as sand or the like.

Previously provided continuous clay washing apparatuses have not been satisfactory in that water entering the bottom thereof containing air bubbles often carry grains of the granular material from which the clay is washed to the overflow tube so that some of the granular material is drained off with the clay washed therefrom. This is of course undesirable since if the granular material is lost along with the clay washed therefrom an accurate determination of the percentage of clay mixed with the granular material is difficult to obtain.

The continuous clay washers of the past have had another disadvantage in that since the diameter thereof increased gradually from the bottom to the top and the washing water was introduced at the bottom in the center thereof the velocity gradient of the water passing through the granular material over the cross section at the overflow tube is pronounced. The pronounced velocity gradient produced non-uniform washing of the granular material at the center and sides of the clay washers requiring a longer period of washing before all of the clay is washed from the granular material at the sides.

It is therefore one of the purposes of the present invention to provide continuous clay washing apparatus including means for minimizing the amount of granular material drained through the overflow tube with the wash water.

Another object is to provide continuous clay washing apparatus having a substantially constant wash water velocity over the entire cross section thereof.

Another object is to provide a continuous clay washing apparatus including basin and cylinder means for holding a sample of granular material to be washed and rotating means centrally located near the bottom of the basin means for introducing wash water thereinto in a revolving jet stream whereby the velocity gradient of the wash water as it rises in the basin and cylinder means is substantially constant over the cross section thereof.

Another object is to provide continuous clay washing apparatus including a sample basin having two different axial diameters whereby the grains of granular material carried to the surface by the wash water in air bubbles are considerably offset from the overflow tube to minimize the amount of granular material drained through the overflow tube of the clay washing apparatus with the wash water.

Another object is to provide continuous clay washing apparatus as set forth above and further including means for separating the granular material passing through the overflow tube with the wash water and other materials from the wash water so that the granular material may be included in computations of the percentage of clay and similar materials in the samples tested.

Another object is to provide continuous clay washing apparatus including a supporting structure, means secured to the supporting structure having different diameters at the bottom and top thereof and a tapered transitional portion therebetween for holding a sample of mixed sand and clay to be washed, means for supplying water under pressure in a rotating jet stream into the bottom of the sample holding means, means for draining off washing water and material suspended therein at the top of the sample holding means, and means for separating from the wash water the granular material drained from the sample holding means with the wash water.

Another object is to provide continuous clay washing apparatus which is simple in construction, economical to manufacture and efficient in use.

Other objects and features of the invention will become apparent as the description proceeds, especially when taken in conjunction with the accompanying drawings, illustrating a preferred embodiment of the invention, wherein.

With particular reference to the drawings, a specific embodiment of the invention will now be disclosed.

Figures 1, 3:
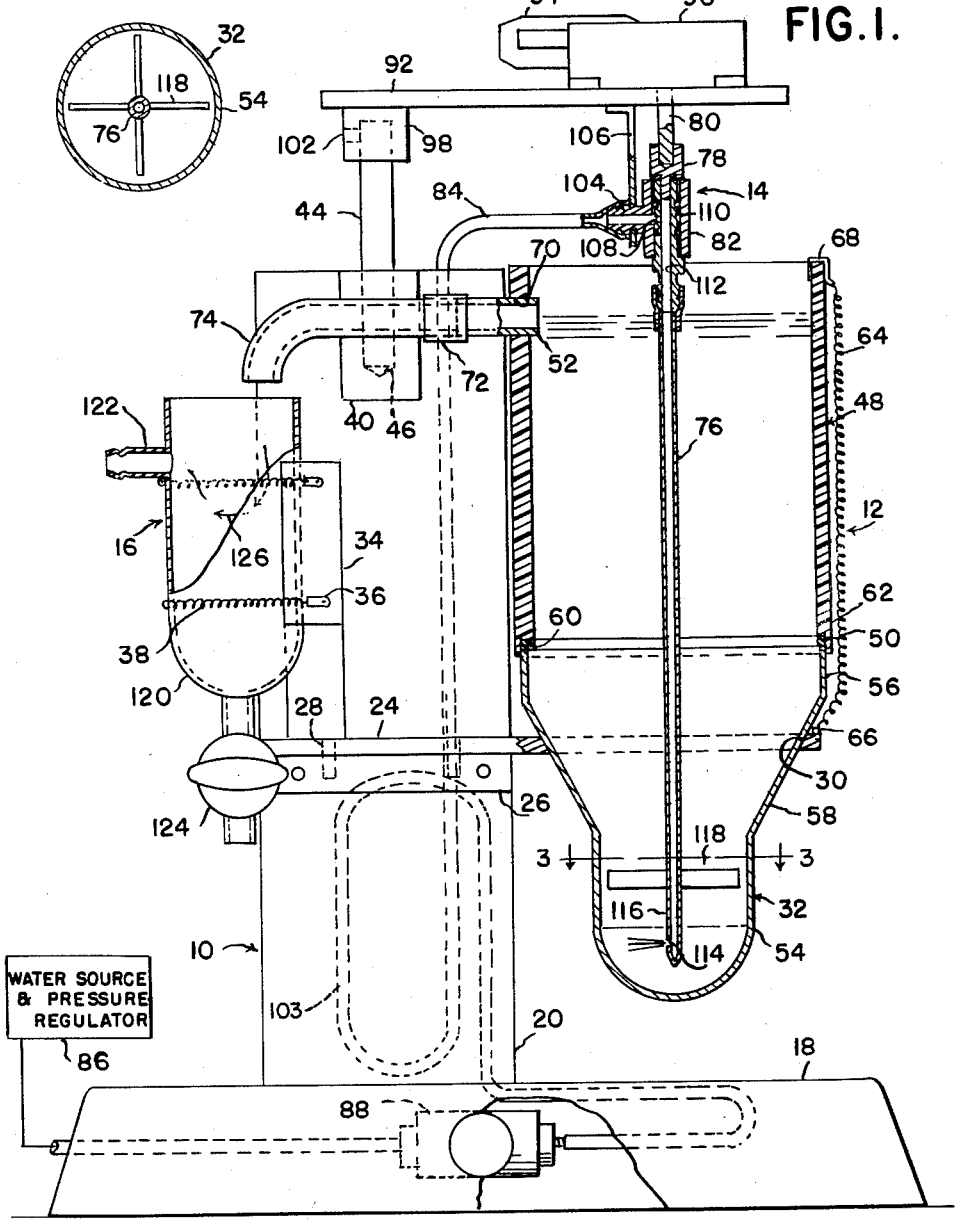
FIGURE 1 is an elevational view partly in section of the continuous clay washing apparatus of the invention.
FIGURE 3 is a cross section of a portion of the continuous clay washing apparatus shown in FIGURE 1 taken on the line 3—3 in FIGURE 1.

The continuous clay washing apparatus of the invention, as shown best in FIGURE 1, comprises supporting structure 10 carrying the means 12 for holding a sample of mixed sand and clay to be washed. The supporting structure 10 also carries the means 14 for introducing wash water into the sample holding means 12 in a rotary jet and means 16 for separating and retaining sand drained from the sample holding means 12 along with the clay washed from the sand of the sample.

Figure 2:
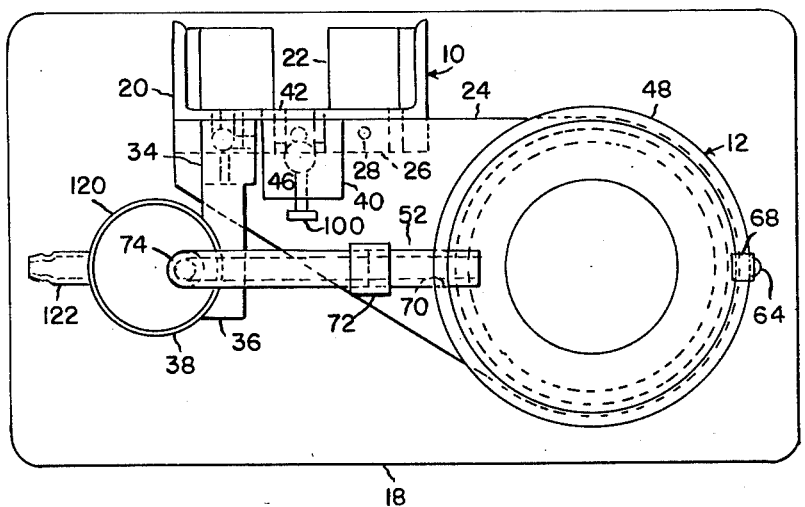
FIGURE 2 is a top view of the continuous clay washing apparatus shown in FIGURE 1 with the means for supplying wash water thereto in a rotating jet removed therefrom.

More specifically, the supporting structure 10 comprises a base 18 having a vertically extending channel 20 secured thereto by means of the angle brackets 22. A supporting plate 24, shaped as shown best in FIGURE 2, is secured to the channel member 20 by convenient means, such as the bracket 26 and bolts 28. The supporting plate 24 is provided with a tapered opening 30 adapted to hold the sample basin 32 of the sample holding means 12 therein, as shown best in FIGURE 1.

A bracket 34 is also secured to the channel member 20 and is shaped as shown in FIGURES 1 and 2 to receive the sand separating and retaining means 16. The bracket 34 is provided with pins 36 to secure springs 38 to the bracket 34. The springs 38 releasably secure the sand separating and retaining means to the bracket 34 as shown. Bracket 40 is secured to the channel member 20 by convenient means, such as bolts 42, and is adapted to receive the motor mounting shaft 44 in a recess 46 therein.

The sample holding means 12 includes the sample basin 32 referred to above, which may be of Pyrex, and the settling cylinder 48 which is of transparent material, such as Lucite. A rubber gasket 50 is positioned between the sample basin 32 and the settling cylinder 48 to prevent leakage of wash water therebetween. The overflow tube 52 for draining the wash water and material suspended therein from the settling cylinder is carried by the the cylinder 48 as shown.

The sample basin has a considerably smaller diameter at end 54 thereof than at end 56 and a transitional portion 58 therebetween. The transitional portion 58 is adapted to make surface to surface contact with the tapered opening 30 in the support plate 24. The different diameter portions of the sample basin 32 are important in that with such construction grains of sand on which air bubbles nucleate as the wash water enters the sample basin will rise vertically substantially within the confines of a cylinder having a diameter the same as the small diameter of the sample basin and located centrally of the larger diameter settling cylinder. The suspended sand will not therefore be likely to be drained from the settling cylinder through the overflow tube 52 since, as the bubbles reach the surface of the water in the settling cylinder, they usually break, whereupon the the suspended grains of sand are permitted to settle back into the sample basin. With the sand grains carried by the air bubbles radially displaced from the overflow tube, the breaking of the air bubbles and subsequent settling of the sand grains usually takes place before the sand grains are drained from the sample basin through the tube 52.

The settling cylinder 48 is provided with an internal annular recess 60 at the end 62 thereof into which the gasket 50 which may be of rubber or other sealing material is cemented to provide a seal between the end 56 of the sample basin and the end 62 of the settling cylinder in assembly. The settling cylinder 48 is secured on the sample basin 32 by means of the spring 64 secured to the supporting plate 24 by pin 66 and removably clamped over the edge of the settling cylinder by means of clamp 68, as shown. A plurality of springs 64 may be provided angularly about the settling cylinder as needed.

The overflow tube 52 is positioned in an opening 70 in the settling cylinder 48, as shown best in FIGURE 1, and may be made of the same material of which the settling basin 48 is constructed in two parts connected by a link of plastic hose 72, as shown best in FIGURE 1. It will be noted that the overflow tube 52 has a curved portion 74 at the outer end thereof immediately above the catch basin 16. The curved portion aids in the separating of the sand grains drained from the settling cylinder through the tube 52 since the air bubbles carrying the sand grains which still exist in the tube 52 tend to release the grains of sand carried thereby on a change of direction of the fluid supporting the air bubbles.

The means 14 for delivering wash water to the bottom of the sample basin in a rotating jet includes a rotatable feed tube 76 secured to a hollow drive sleeve 78. The hollow drive sleeve 78 is supported on the drive shaft 80 and in turn supports the rotary fitting 82 thereon. Water under pressure is fed to the rotary fitting 82 through plastic hose 84 from a source 86 of water under regulated pressure through the vernier pressure control needle valve 88, as shown in FIGURE 1. The means 14 for supplying water in a rotating jet further includes the motor 90 mounted on plate 92 along with a control panel 94 and a toggle switch (not shown). The supporting plate 92 is secured in bracket 40 by means of shaft 44 and boss 98.

An adjustable screw 100 is provided to releasably secure the lower end of the shaft 44 in the bracket 40 while the set screw 102 is provided to secure the other end of the shaft 44 in the boss 98. Thus, in operation it will be seen that the lower end of the shaft 44 may be released from bracket 40 by means of screw 100 whereby the motor 90, feed tube 76 and hose 84, together with their coupling mechanisms, may be lifted vertically with respect to the sample basin 32 and the settling cylinder 48 to permit removal of a sample from the continuous clay washer. The loop 103 in hose 84 is provided to facilitate vertical movement of the motor and feed tube.

The rotary fitting 82 is provided with a right angle hose nipple 104 for securing the hose 84 thereto and is prevented from rotation with the hollow drive sleeve 78 by means of the forked plate 106 secured to the supporting plate 92, as shown in FIGURE 1. Thus, in operation the feed tube 76 which may be of chromium plated copper is rotated with the drive sleeve 78 by means of the drive shaft 80 and motor 90. The water from the vernier control 88 passes through the Tygon plastic hose 84 and is fed to the feed tube 76 through the hollow hose nipple 104 and the passage 108 transversely of the drive sleeve 78 in conjunction with the annular passage 110 therearound and the axial passage 112 therethrough.

The water under pressure as controlled by the vernier control 88 is discharged through the opening 114 in the lower end of the feed tube 76. It will be noted that the opening 114 in the lower end 116 of the feed tube 76 is offset from the center of the tube so that the water which is discharged therefrom in a jet stream under the pressure maintained by the vernier control 88 is directed transversely of the sample basin 32 and somewhat downwardly. Thus, as the feed tube 76 is rotated by motor 90, the water is introduced into the sample basin in a rotating jet stream.

The introduction of the wash water into the sample basin in a rotating jet stream causes agitation and mixing of the granular material in the sample basin 32 so that the clay is more quickly removed therefrom and fewer grains of sand are carried to the top of the settling cylinder by air bubbles. The agitation of the granular material is aided by the vanes 118 extending horizontally from the rotating feed tube adjacent the bottom thereof.

The introduction of the wash water into the sample basin 32 in a rotating jet stream in conjunction with the vanes 118 also disperses the water in the portion 54 of the sample basin 32 to prevent channeling of the water along the axis of the sample basin and settling cylinder. The effect of the vanes and rotating jet stream of wash water is similar to introducing water at a uniform vertical velocity over the entire cross section of the portion 54 of the sample basin 32.

The speed at which clay is washed from sand is much improved due to the laminar nature of flow at a uniform vertical velocity with the water introduced into the sample basin in a rotating jet stream as compared to more turbulent flow of wash water introduced into sample basins in a stationary vertical jet. For example fifty grams of sand may be washed in an elutriator as disclosed herein, with the motor 90 rotating at between 20 and 30 revolutions per minute and the water set to flow vertically through the sample holding means 12, in approximately one and one-half hours as compared to three hours with prior devices.

The sand separating and retaining means 16 is held in place on bracket 34 by removable spring means 38 as previously indicated and comprises a catch basin 120 having an overflow nipple 122 adjacent the upper end thereof and a stopcock 124 at the lower end thereof. The overflow nipple 122 may be connected by means of plastic hose to a drain as will be understood by those in the art.

In operation, as the wash water rises in the settling cylinder 48 above the level of the overflow tube 52, the wash water and material carried thereby will be drained off into the catch basin 120. When the wash water and material suspended therein fill the catch basin to the hose nipple 122, the wash water and material will be discharged therefrom to the drain previously mentioned.

The catch basin is provided for the purpose of removing a large percentage of the grains of sand which are transferred through the overflow tube 52 with the wash water. Thus, as the grains of sand carried by air bubbles change directions in the arcuate end 74 of the tube 52 they may be separated from the air bubbles. Further separation of the grains of sand from the air bubbles is effected due to the vertical drop of the grains of sand with the air bubbles from the discharge end of the tube 52 to the surface of the fluid in the catch basin 120. Still further settling of the grains of sand in the catch basin is effected due to the change in direction necessary for the grains of sand to be discharged through the overflow nipple 122 as indicated by the arcuate path of the arrows 126 in FIGURE 1. When the sand is thoroughly washed, the grains of sand retained in the catch basin are added to the sand in the sample basin 32 to more accurately determine the percentage of clay and other materials washed therefrom.

In over-all operation when it is desired to wash a sample of sand having clay mixed therewith to remove the clay therefrom so that the remaining sand may be weighed to determine the percentage of clay therein, the motor 90, hose 84 and feed tube 76 are lifted vertically from the continuous clay washing apparatus. The clamps 68 are removed from the settling cylinder 48 and the settling cylinder 48 and sample basin 32 are removed from the apparatus. The sample to be washed is placed in the sample basin 32 and the sample basin and settling cylinder 48 are replaced in the position shown in FIGURE 1. The motor 90, hose 84 and feed rod 76 are then also returned to the position shown in FIGURE 1.

The motor 90 is then started to rotate the feed tube 76 and the vernier control 88 is actuated to permit water under predetermined pressure to flow through the hose 84 and feed tube 76 from which it is discharged in a rotating jet stream which gives the effect of introducing the water at a uniform velocity over the entire cross section of the portion 54 of the sample basin. The wash water thus proceeds upwardly at a substantially uniform rate over the entire cross section of the sample basin and settling cylinder in a laminar rather than turbulent flow as previously indicated whereby uniform washing of the sand in all portions of the sample basin and settling cylinder is provided. The speed with which all of the clay may be washed from the sand is thus increased. The speed of washing the clay from the sand is further increased by the agitation of the grains of sand both of means of the jet stream and the rotating vanes.

The water and the clay carried thereby are drained off of the top of the settling cylinder by means of the overflow tube 52 as previously indicated. Very few grains of sand suported by air bubbles are withdrawn from the settling cylinder 48 as previously indicated due to the difference in diameter of the ends 54 and 56 of the sample basin which causes the grains of sand suspended in the air bubbles to move to the surface at a distance from the discharge tube 52.

The grains of sand which are withdrawn from the settling cylinder through the tube 52 are for the most part separated from the air bubbles supporting them either during the change in direction thereof in the curved section 74 of the tube 52 or when the bubbles carrying the sand grains hit the surface of the fluid in the catch basin 120 or when the air bubbles change direction in the catch basin. Thus a greater percentage of the small percent of sand which is drawn off from the settling cylinder is trapped in the catch basin 120 from which it may be returned to the sample basin 32 after the washing is complete.

Thus it will be seen that in accordance with the invention there is provided novel continuous clay washing apparatus which provides means for insuring accuracy of measurement of clay washed from the sand placed therein at a substantially increased rate.

While a particular embodiment of the elutriator of the invention has been described it will be obvious that other modifications are possible. For example, the bottom portion 54 of the sample basin 32 and the method of introducing water thereinto disclosed herein may be combined with previously known elutriator structures. All such modifications as suggest themselves as a result of the above disclosure are intended to be included within the scope of the invention.

The drawings and the foregoing specification constitute a description of the improved continuous clay washing apparatus in such full, clear, concise and exact terms as to enable any person skilled in the art to practice the invention, the scope of which is indicated by the appended claims.

What we claim as our invention is:

1. Continuous clay washing apparatus for washing clay and similar material from granular material such as sand comprising a container having a relatively small diameter portion at the bottom and a relatively large diameter portion at the top with a transitional portion therebetween of intermediate axial extent for receiving a sample of the granular material, a hollow tube suspended within said container from the top thereof and coaxial therewith having a transverse opening therein near the bottom thereof for introducing wash water into said container at the bottom thereof, means for supplying water under pressure through said tube, and means for rotating said tube whereby the water is introduced into said container in a rotating radial jet stream.

2. Structure as claimed in claim 1 wherein vanes are provided on said tube adjacent the bottom thereof extending radially of the container for agitating the granular material during washing thereof.

3. An elutriator for continuously washing clay and similar materials from granular material such as sand comprising a supporting structure including a horizontally extending base, a vertically extending channel member secured to said base and a supporting plate having an opening therethrough which supporting plate extends parallel to the base and is secured to the channel member, a sample holding means positioned within the opening in the supporting plate and supported by the supporting plate including a sample basin having a smaller diameter lower end, a larger diameter upper end and a transitional portion between the upper and lower ends and a settling cylinder having substantially the same diameter as the upper end of the sample basin and positioned thereon concentric therewith, means for delivering wash water into the lower end of the sample basin in a rotating radial jet stream including a rotatable tube extending into the sample holding means from the top thereof having a radially extending opening therein adjacent the bottom thereof, means for feeding wash water through the tube and out of the radial opening therein under pressure including a water source and pressure regulating means and an elongated flexible tube extending between the rotatable tube and the pressure regulating means, means for rotating the rotatable tube including a motor and supporting means therefor which supporting means is supported on said channel member and a radially extending overflow tube extending through said settling cylinder adjacent the top thereof.

4. An elutriator as set forth in claim 3 wherein said motor, supporting means therefor and rotatable tube are movable together, said supporting means is releasably secured to said channel member and said flexible tube is of a length to permit vertical movement of the motor, supporting means and rotatable tube to remove the rotatable tube from the sample basin and settling cylinder and the settling cylinder is removably secured to the sample basin to provide easy access to a sample of granular material in the sample basin.

5. An elutriator as set forth in claim 3 wherein said overflow tube is provided with an arcuate radially outer end opening downward and further including a catch basin supported by said channel member below the outer end of the overflow tube having an overflow nipple adjacent the top thereof for separating granular material carried through the overflow tube in air bubbles from the air bubbles.

6. An elutriator for continuously washing clay and similar materials from granular material such as sand comprising a supporting structure, sample holding means supported by the supporting structure including a sample basin having a smaller diameter lower end, a larger diameter upper end and a transitional portion between the upper and lower ends and a settling cylinder having substantially the same diameter as the upper end of the sample basin and positioned thereon concentric therewith, and means for delivering wash water into the lower end of the sample basin in a rotating radial jet stream including a rotatable tube extending into the sample holding means from the top thereof having a radially extending opening therein adjacent the bottom thereof, means for feeding wash water through the tube and out of the radial opening therein under pressure including a water source and pressure regulating means and an elongated flexible tube extending between the rotatable tube and the pressure regulating means, means for rotating the rotatable tube including a motor supported on said supporting structure and a radially extending overflow tube extending through said settling cylinder adjacent the top thereof.

7. An elutriator for continuously washing clay and similar materials from granular material such as sand comprising a supporting structure including a horizontally extending base, a vertically extending channel member secured to said base and a supporting plate having an opening therethrough which supporting plate extends parallel to the base and is secured to the channel member, a sample holding means positioned within the opening in the supporting plate and supported by the supporting plate including a sample basin having a smaller diameter lower end, a larger diameter upper end and a transitional portion between the upper and lower ends and a settling cylinder having substantially the same diameter as the upper end of the sample basin and positioned thereon concentric therewith, and means for delivering wash water into the lower end of the sample basin in a rotating radial jet stream including a rotatable tube extending into the sample holding means from the top thereof having a radially extending opening therein adjacent the bottom thereof, means for feeding wash water through the tube and out of the radial opening therein under pressure, means for rotating the rotatable tube and a radially extending overflow tube extending through said settling cylinder adjacent the top thereof.

8. An elutriator for continuously washing clay and similar materials from granular material such as sand comprising a supporting structure, sample holding means supported by the supporting structure including a sample basin having a smaller diameter lower end, a larger diameter upper end and a transitional portion between the upper and lower ends and a settling cylinder having substantially the same diameter as the upper end of the sample basin and positioned thereon concentric therewith, and means for delivering wash water into the lower end of the sample basin in a rotating radial jet stream including a rotatable tube extending into the sample holding means from the top thereof having a radially extending opening therein adjacent the bottom thereof, means for feeding wash water through the tube and out of the radial opening therein under pressure, means for rotating the rotatable tube and a radially extending overflow tube extending through said settling cylinder adjacent the top thereof.

References Cited in the file of this patent
UNITED STATES PATENTS

| | | |
|---|---|---|
| 307,560 | Malter | Nov. 4, 1884 |
| 353,775 | Booraem | Dec. 7, 1886 |
| 1,430,665 | Mayhew | Oct. 3, 1922 |
| 1,432,766 | Linden | Oct. 24, 1922 |
| 1,556,083 | Damon | Oct. 6, 1925 |
| 1,888,131 | Humphrey | Nov. 15, 1932 |
| 2,033,008 | Remick | Mar. 3, 1936 |
| 2,521,334 | Boerstra | Sept. 5, 1950 |
| 2,588,591 | Thompson | Mar. 11, 1952 |
| 2,855,098 | Jameson | Oct. 7, 1958 |
| 2,960,227 | Eder | Nov. 15, 1960 |
| 3,018,890 | Chuffart | Jan. 30, 1962 |